United States Patent
Yehoshua et al.

(10) Patent No.: US 12,475,248 B1
(45) Date of Patent: Nov. 18, 2025

(54) CONSOLIDATING A SOURCE WORKSPACE AND A TARGET WORKSPACE INTO A SINGLE WORKSPACE

(71) Applicant: Notion Labs, Inc., San Francisco, CA (US)

(72) Inventors: Ron Yehoshua, Oakland, CA (US); Birkan Icacan, San Francisco, CA (US); Vicky Wenqi Zhang, New York, NY (US); Peiyao Chen, New York City, NY (US); Cristina Lozano, Brooklyn, NY (US); Marissa Jessica Lafontant Felix, Brooklyn, NY (US)

(73) Assignee: Notion Labs, Inc., San Francisco, CA (US)

( * ) Notice: Subject to any disclaimer, the term of this patent is extended or adjusted under 35 U.S.C. 154(b) by 62 days.

(21) Appl. No.: 18/665,921

(22) Filed: May 16, 2024

(51) Int. Cl.
 *G06F 21/62* (2013.01)
(52) U.S. Cl.
 CPC .............................. *G06F 21/6218* (2013.01)
(58) Field of Classification Search
 CPC .................................................. G06F 21/6218
 See application file for complete search history.

(56) References Cited

U.S. PATENT DOCUMENTS

| | | | |
|---|---|---|---|
| 9,485,259 B1 * | 11/2016 | Doermann | G06F 21/6218 |
| 9,805,209 B2 * | 10/2017 | Naglost | H04L 63/101 |
| 10,691,645 B2 * | 6/2020 | Duval | G06F 16/178 |
| 10,878,066 B2 * | 12/2020 | Qiu | G06F 21/121 |
| 11,025,718 B2 * | 6/2021 | Savage | H04L 67/1095 |
| 11,836,227 B2 * | 12/2023 | Iyer | G06F 21/105 |
| 11,941,347 B2 * | 3/2024 | Zheng | G06F 40/166 |
| 11,943,305 B2 * | 3/2024 | Bentley | H04L 67/141 |
| 12,033,103 B1 * | 7/2024 | Schmidt | G06Q 10/0635 |
| 12,259,997 B2 * | 3/2025 | Costello | G06F 21/604 |
| 12,278,864 B2 * | 4/2025 | Singh | G06F 9/45558 |
| 12,400,011 B1 * | 8/2025 | Davidson | G06F 21/6218 |
| 2013/0298140 A1 * | 11/2013 | Wolfe | G06F 9/542 719/319 |
| 2015/0180872 A1 * | 6/2015 | Christner | H04L 63/10 726/4 |
| 2016/0014097 A1 * | 1/2016 | Swineford | G06F 21/6218 713/162 |
| 2016/0321464 A1 * | 11/2016 | Tamayo-Rios | H04L 63/0428 |
| 2017/0136622 A1 * | 5/2017 | Bruemmer | B25J 9/161 |
| 2017/0244742 A1 * | 8/2017 | Helmsen | H04L 63/14 |
| 2018/0307381 A1 * | 10/2018 | Bashir | G06Q 10/10 |
| 2019/0129582 A1 * | 5/2019 | Uchiumi | G06F 16/168 |

(Continued)

*Primary Examiner* — Gary S Gracia
(74) *Attorney, Agent, or Firm* — Perkins Coie LLP; Alberto Araiza; Lena Petrovic

(57) ABSTRACT

The system obtains an indication to consolidate a source node and a target node. The source node is associated with a hierarchy of multiple source records arranged in multiple levels. The source record and target record are associated with a source permission and target permission, respectively. The system creates a copy of the hierarchy of the multiple source records, where the copy is a child of the target node. The system determines whether the target permission is more restrictive than the source permission. If the target permission is more restrictive, the system sets a permission associated with the copy to the target permission; otherwise, the system sets the permission associated with the copy to the source permission.

20 Claims, 10 Drawing Sheets

(56) References Cited

U.S. PATENT DOCUMENTS

| | | | |
|---|---|---|---|
| 2019/0129583 A1* | 5/2019 | Yamada | G06F 16/93 |
| 2021/0105280 A1* | 4/2021 | Lansing | G06F 16/93 |
| 2021/0133257 A1* | 5/2021 | Feijoo | G06F 16/951 |
| 2022/0211270 A1* | 7/2022 | Itkowtiz | A61B 34/10 |
| 2022/0300339 A1* | 9/2022 | Iyer | G06F 21/45 |
| 2023/0072696 A1* | 3/2023 | Bartolotta | G06F 8/65 |
| 2023/0177502 A1* | 6/2023 | Gnanasambandam | G06Q 20/389 705/39 |
| 2023/0187036 A1* | 6/2023 | Gnanasambandam | G16H 50/70 705/3 |
| 2023/0237743 A1* | 7/2023 | Rieger | G06F 16/904 345/419 |
| 2023/0244477 A1* | 8/2023 | Moondhra | G06F 16/903 717/121 |
| 2023/0297332 A1* | 9/2023 | Orgad | G06F 16/221 707/753 |
| 2023/0360779 A1* | 11/2023 | Gnanasambandam | G06Q 20/3678 |
| 2024/0256293 A1* | 8/2024 | Hashimoto | G06F 9/44505 |
| 2025/0232544 A1* | 7/2025 | Vasudevan | G06T 19/20 |

\* cited by examiner

CONSOLIDATING A SOURCE WORKSPACE AND A TARGET WORKSPACE INTO A SINGLE WORKSPACE

BACKGROUND

Large organizations of a productivity platform can create hundreds of workspaces containing millions of documents all relating to the same organization. These scattered workspaces relating to the same organization are difficult to manage, leading to difficulty in maintenance, relevance, and duplication of information.

BRIEF DESCRIPTION OF THE DRAWINGS

Reference will now be made, by way of example, to the accompanying drawings, which show example embodiments of the present application, and in which.

Figure 1:
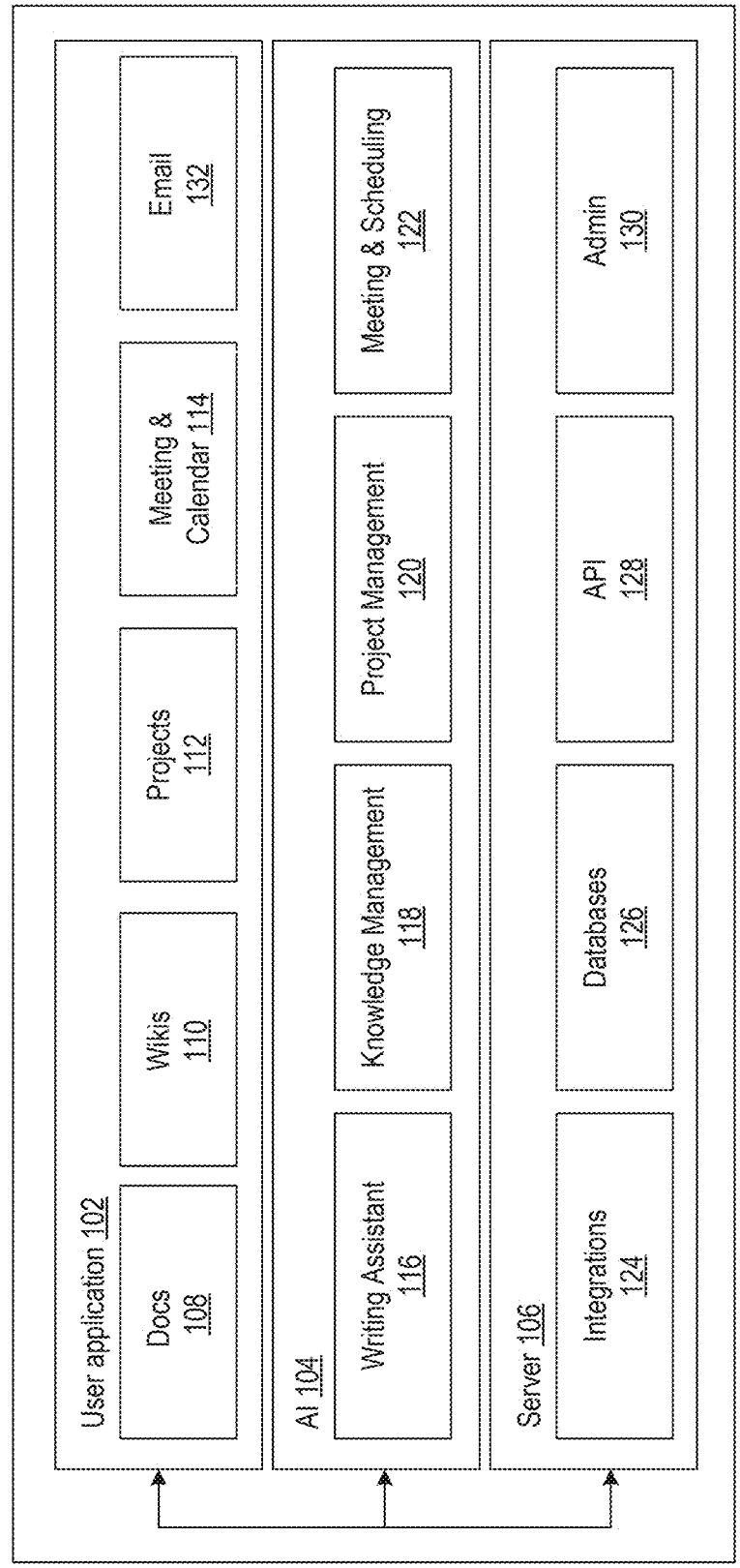
FIG. 1 is a block diagram of an example platform.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides for two workspaces. The system obtains an indication to consolidate a source workspace and a target workspace. The source workspace is associated with a hierarchy of multiple source records arranged in multiple levels. A source record among the multiple source records includes content and is associated with a source permission defining a user A and an access A to the source record associated with the user A. The target workspace is associated with a target permission defining a user B and an access B associated with the target workspace.

The system creates a copy of the hierarchy of the multiple source records including the content, where the copy of the hierarchy of the multiple source records is a child of the target workspace. The system determines whether the target permission is more restrictive than the source permission. Upon determining that the target permission is more restrictive than the source permission, the system sets a permission associated with the copy of the hierarchy of the multiple source records to the target permission. Upon determining that the source permission is more restrictive than the target permission, the system sets the permission associated with the copy of the hierarchy of the multiple source records to the source permission.

The solution allows Enterprise customers to duplicate content (e.g., Notion pages), structure (e.g., teamspaces), and permissions (e.g., page permissions) in one workspace they "own" (ownership based on domain claim) into another Enterprise workspace.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No" ]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. SaveTransactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database-meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an AI tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or sub-pages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading) or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and urgent information layout. Each view can include a customized structure including custom criteria, custom properties, and custom actions. The custom properties can be specific to a view such as artificial intelligence-extracted properties, and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The AI tool 104 is an integrated AI assistant that enables AI-based functions for the user application 102. In one example, the AI tool 104 is based on a neural network architecture, such as the transformer 212 described in FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including a text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include auto filling information based on changes within the workspace or automatically track project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 200 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 2:
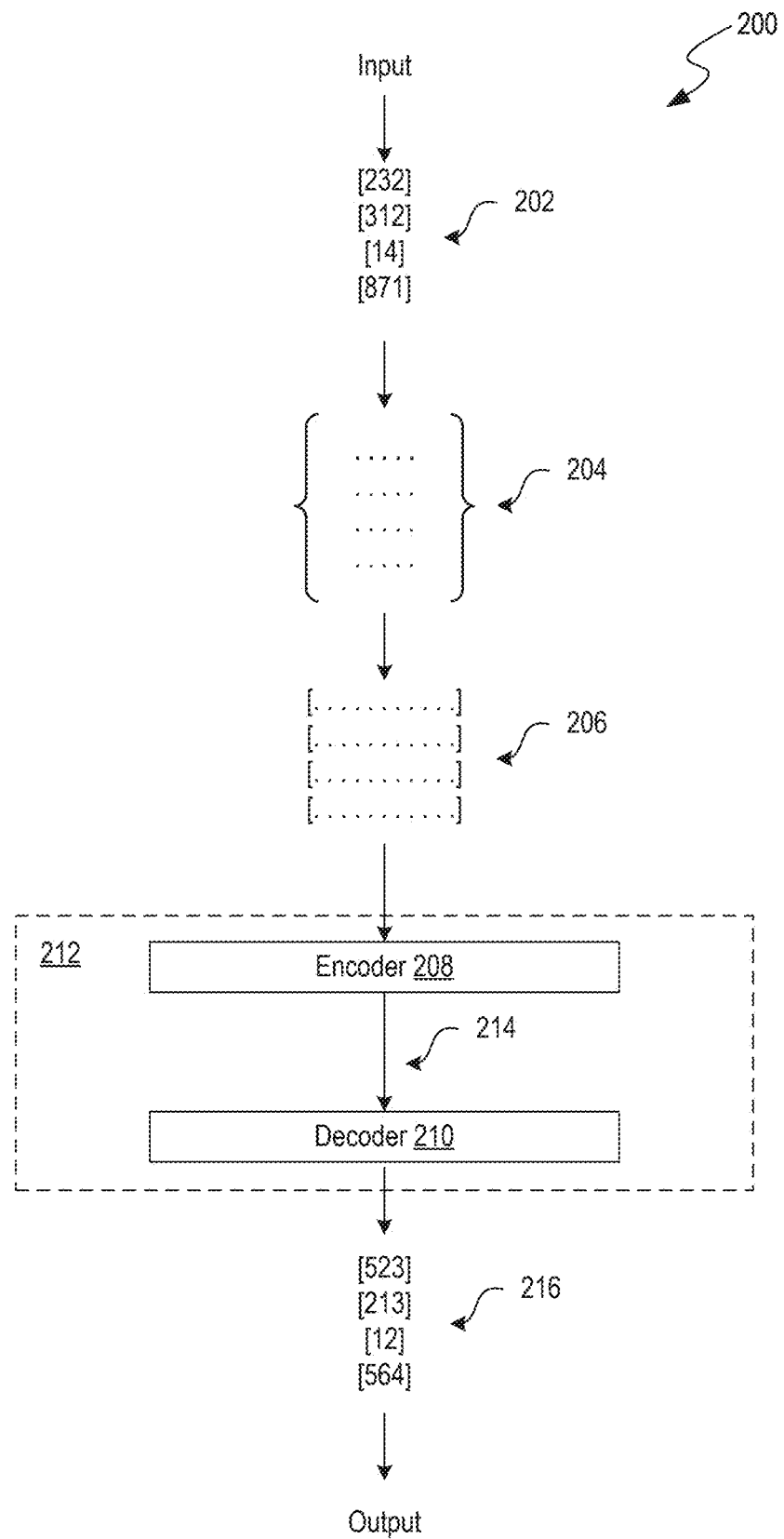
FIG. 2 is a block diagram of an example transformer.

FIG. 2 is a block diagram of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as recurrent neural network (RNN)-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
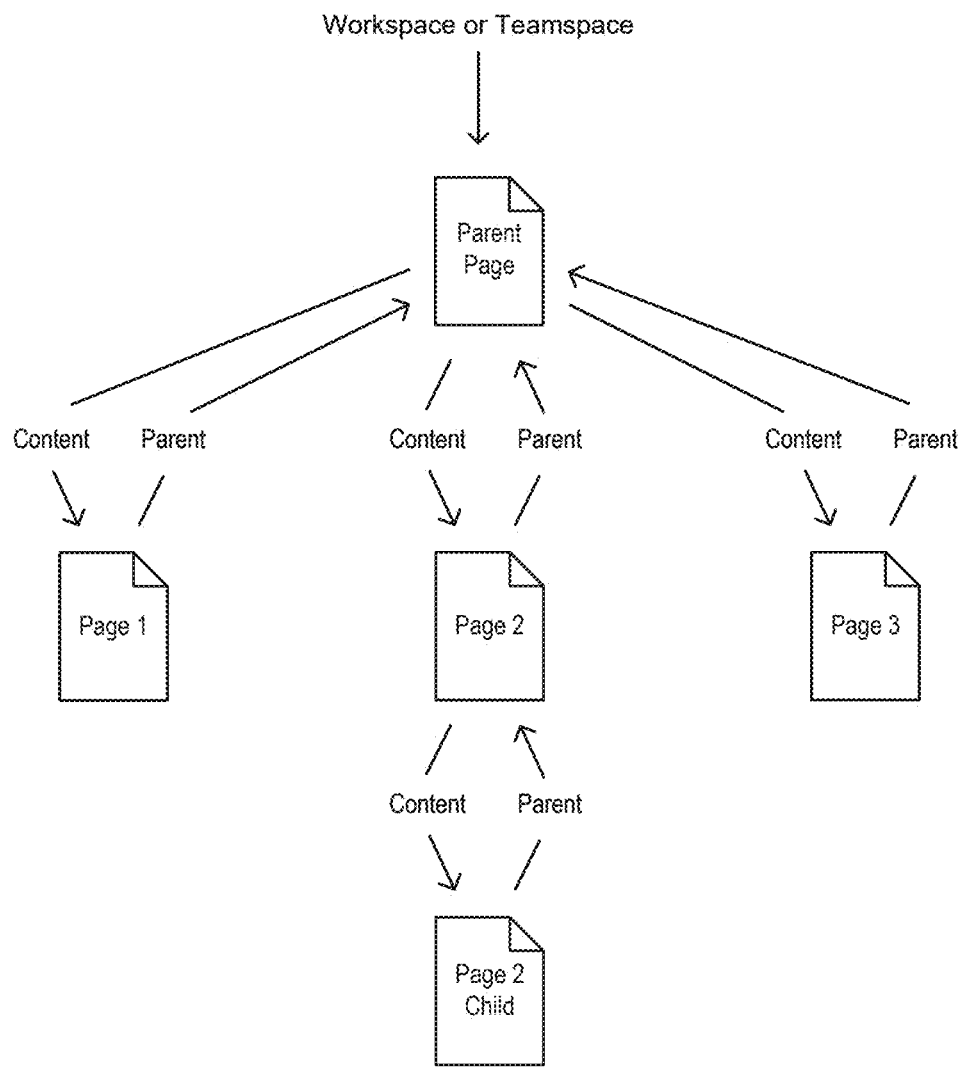
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child" which is a grandchild of "Parent Page" and child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Consolidating a Source Workspace and a Target Workspace into a Single Workspace

Figure 4:
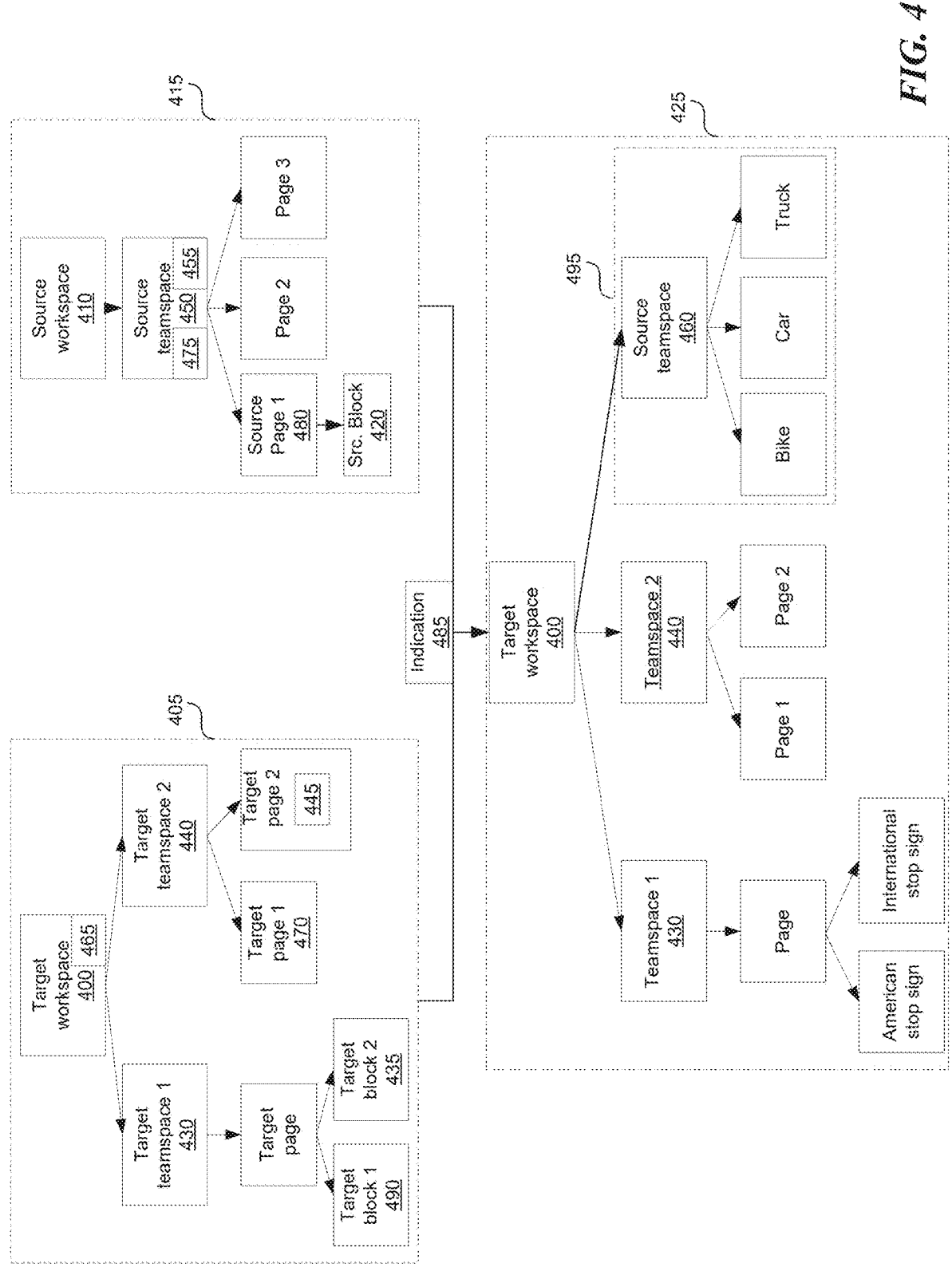
FIG. 4 shows a target workspace and a source workspace prior to consolidation and the target workspace after the consolidation.

FIG. 4 shows a target workspace and a source workspace prior to consolidation and the target workspace after the consolidation. A workspace 400, 410 can be a top-level node defining a hierarchical structure 405, 415, 425 including teamspaces 430, 440, 450, 460, pages 470, 480 (only two labeled for brevity) and blocks 490, 420, 435. A teamspace 430, 440, 450, 460 can include multiple pages 470, 480, which in turn can include multiple blocks 490, 420, 435. A page 470, 480 can have various types such as documents, wikis, projects, meetings, calendars, emails, etc. A block 490, 420, 435 in the page 470, 480 can depend on the page type. For example, a document page can include paragraphs as blocks. A calendar page can include a meeting as a block. In essence, the hierarchical structure 405, 415, 425 is akin to a directory hierarchy for organizing content.

Each element in the hierarchical structure 415, 425, namely, workspace 400, 410, teamspace 430, 440, 450, 460, page 470, 480, and block 490, 420, 435 can be referred to as a record. In effect, each hierarchical structure 405, 415, 425 is a hierarchy of multiple source records arranged in multiple levels. Each record can include content 445, 455 (only two labeled for brevity), such as text, drawings, audio, etc. In addition, each record can have permissions 465, 475 (only two labeled for brevity), which indicate a user and a type of access allowed to the user such as read and/or write. The permissions 465, 475 can indicate group permissions, public page permissions, deleted permissions, etc.

A user may want to consolidate the target workspace 400 and the source workspace 410. The disclosed system can obtain an indication 485 to perform the consolidation. Indication 485 can indicate which portion of the source workspace 410 to move over to the target workspace, such as a portion of the hierarchical structure 405, e.g., the hierarchy rooted at page 480, the whole source workspace 410, or the portion of the hierarchy rooted at teamspace 450. If the indication 485 does not indicate which portion of the source workspace 410 to consolidate, the system can proceed to move all the children of the source workspace 410, namely, source teamspace 450, to the target workspace 400.

Upon obtaining the indication 485, the system makes the hierarchical structure 415 read-only, thus preventing any further modification to the hierarchical structure 415. Upon making the hierarchical structure 415 read-only, the system initiates making a copy 495 of the hierarchical structure. The copy 495 is a child of the target workspace 400. The process of making the copy 495 can take some time because the hierarchical structure 415 can be large and include millions of records. The copy 495 can include the whole hierarchical structure 415, or can include a subset of the hierarchical structure 415, as shown in FIG. 4, where a copy of the source's workspace 410 is missing.

The reason that the system makes the copy 495, instead of referencing the hierarchical structure 415, is to have a backup, namely, the hierarchical structure 415, in case something goes wrong during the consolidation process. If the consolidation is successful, after a predetermined amount of time, such as 30 days, the system deletes the hierarchical structure 415.

The consolidation process makes a copy of the content 455, the hierarchical structure 415, and permissions 465, 475. For example, permission 465 associated with the workspace 400 can be more restrictive than permission 475 associated with the top-level node being copied, which in FIG. 4 is teamspace 450. Specifically, the permission 465 can indicate that no guests are allowed in the workspace 400, that no content 445, 455 can be published publicly, and/or that there are no exports of the content 445, 455. In contrast, the less restrictive permissions 475 can allow guests, public pages, and exports. The system enforces the most restrictive permission. Consequently, when the permission 465 is more restrictive than the permission 475, the system removes all the guest users from the copy 495, disables publicly publishing content 445, 455, and/or disables exporting of the content 445, 455. If the permissions 475 are more restrictive than permissions 465, the system preserves the permissions 475 associated with the copy 495 but does not change the permissions of the teamspaces 430, 440 and their children in the consolidated hierarchical structure 425.

Figure 5:
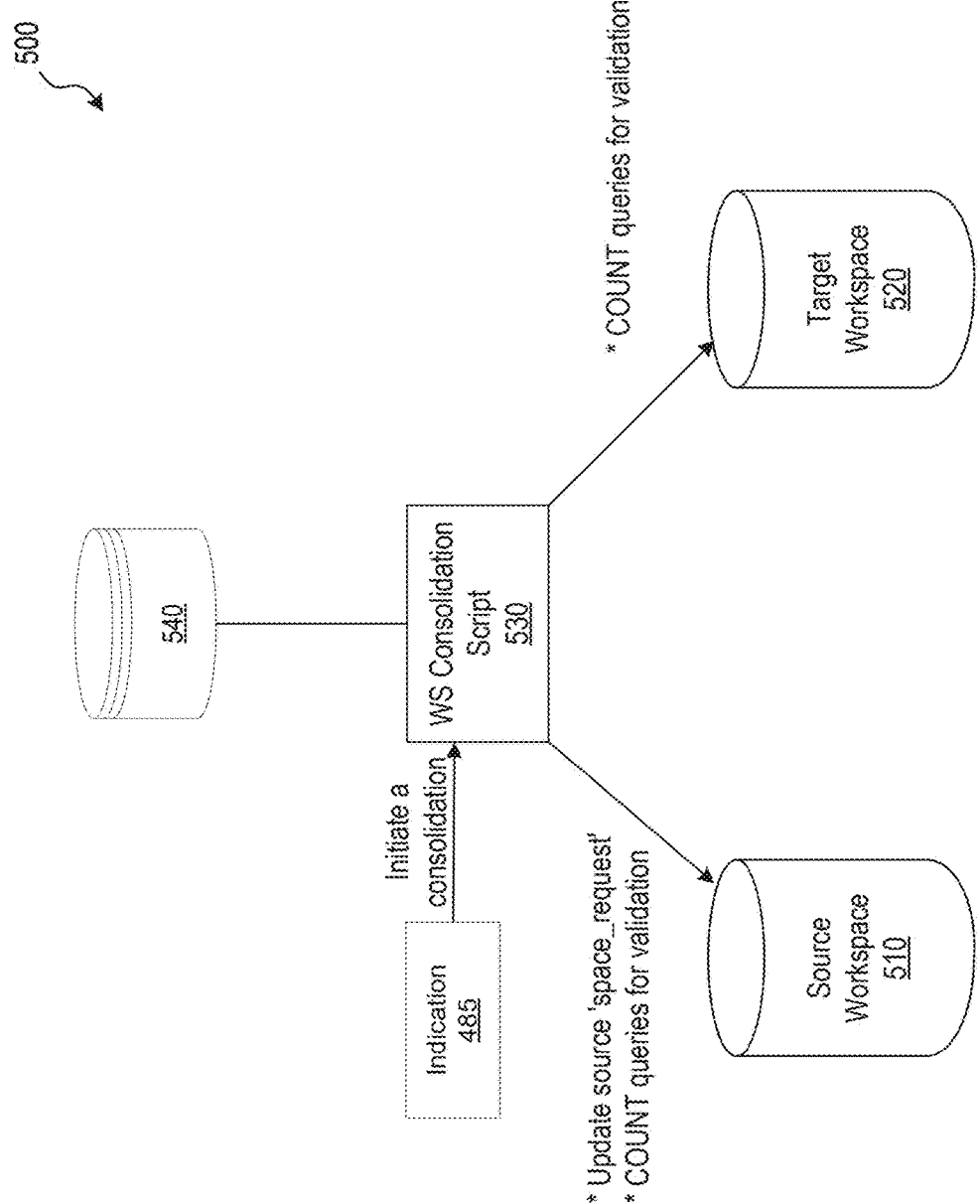
FIG. 5 shows the initiation steps of the consolidation process.

FIG. 5 shows the initiation steps of the consolidation process. Upon receiving the indication 485, the system 500 initiates a consolidation by running the consolidation script 530. Through the consolidation script 530, the system 500 can prevent any changes to the source workspace 510 by creating an error if any edits are attempted in the source workspace. Alternatively, the system 500 can set the source workspace 510 permissions to read-only, thus preventing any further modifications of the source workspace. After successful completion of the consolidation, the system can delete the source workspace 510 after a predetermined amount of time such as 30 days.

In addition, for error-checking purposes, the system 500 can count the number of records to duplicate in the source workspace 510. Upon completing the duplication, the system 500 can count the number of duplicated records in the target workspace 520 and can check whether the number of duplicated records in the target workspace 520 matches the number of records in the source workspace 510. If the numbers do not match, the system 500 can inform the user that not all the records have been duplicated. If the number of duplicated records is below a predetermined threshold of the number of records to duplicate, the system 500 can determine that the duplication failed and can notify the user of the failure. The predetermined threshold can be, for example, 20% of the number of records to duplicate in the source workspace 510.

During the duplication, the system 500 can track the state of the duplication progress in a separate database 540, such as a Postgres database. If the number of errors thrown during the duplication process exceed a predetermined threshold, e.g. 100 right, the duplication process can fail.

Figure 6:
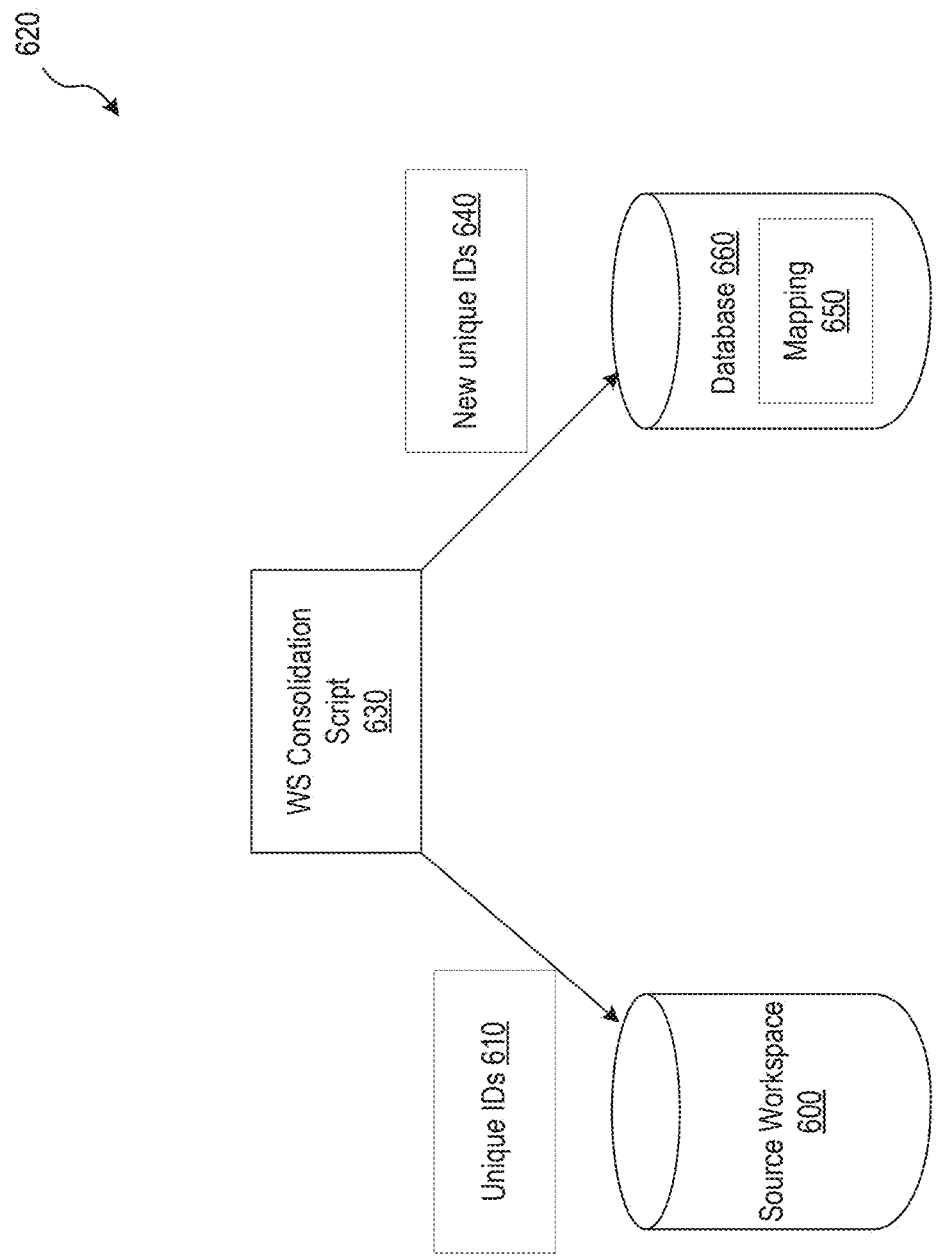
FIG. 6 shows the building of the identifier (ID) mapping in the consolidation process.

FIG. 6 shows the building of the identifier (ID) mapping in the consolidation process. Each record in the source workspace 600 can have a unique ID 610. The system 620 via the consolidation script 630 can obtain all the unique IDs 610 of all the records in the source workspace 600. The system 620 can create new unique IDs 640 corresponding to each record in the source workspace 600 and a mapping 650 between the original unique IDs 610 and the new unique ID 640. The mapping can be one-to-one. The system 620 can store the mapping 650 in a database 660, such as a Postgres database.

The system 620 can store the status of the duplication process in a group, where each group includes a predetermined number of steps, such as 20,000 steps. If a step in the group fails, the system 620 can repeat the group of steps from the beginning.

Figure 7:
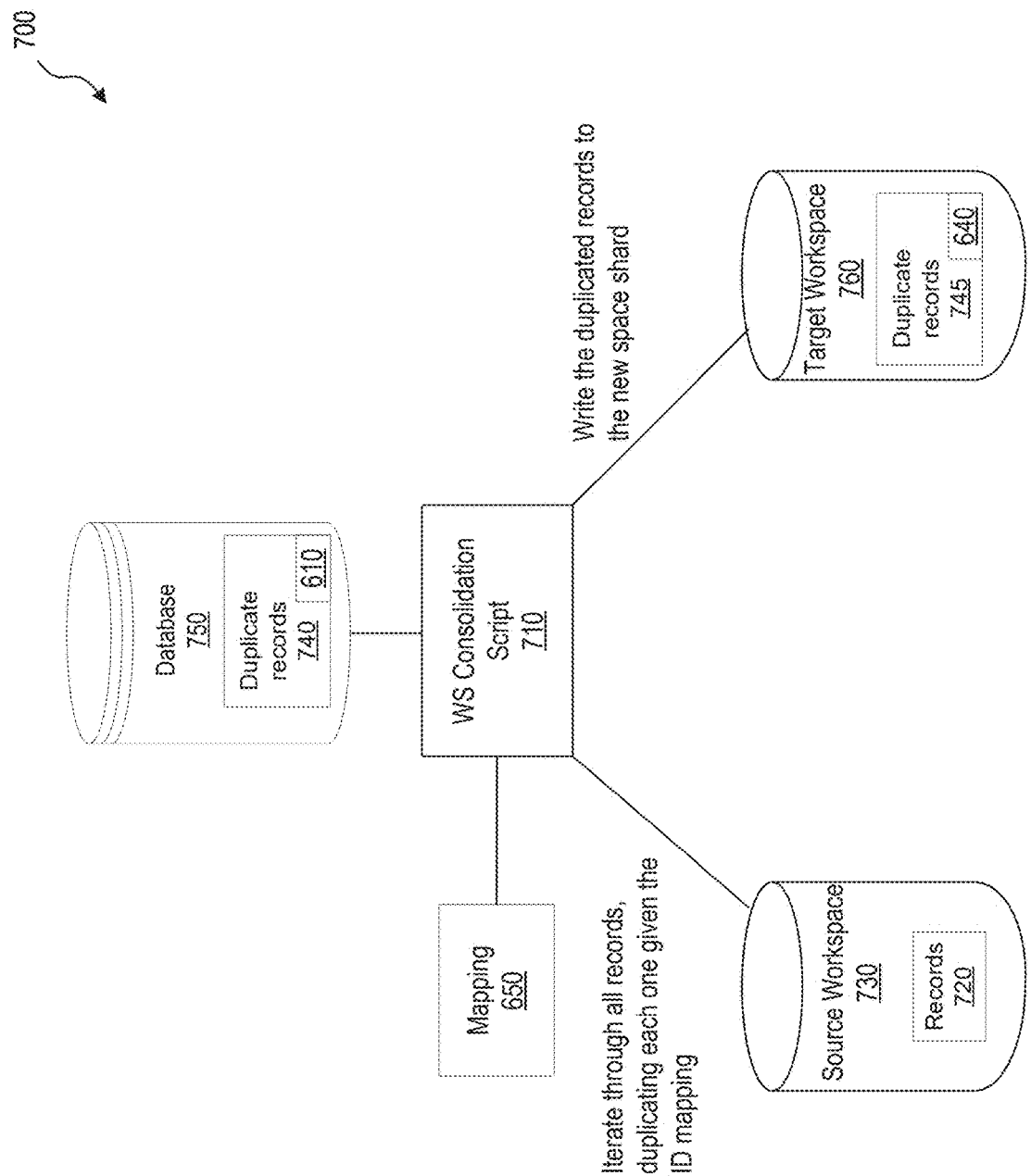
FIG. 7 shows the record duplication step in the consolidation process.

FIG. 7 shows the record duplication step in the consolidation process. The system 700, through the consolidation script 710, obtains all the records 720 from the source workspace 730 and creates the duplicate records 740. The creation of the duplicate records 740 can be a time-consuming operation when there is a large number, such as millions, of duplicate records.

The database 750 can create the duplicate records 740 in the order of IDs 610 in FIG. 6, as opposed to in the order of the hierarchy. This allows the iteration over the source workspace 730 to be done more efficiently, because the database 750 is doing the sorting as opposed to the system 700. Specifically, the database 750 can order the records 720 according to the original IDs 610 and can iterate over the ordered records to create the duplicate records 740. The duplicate records 740 in this state contain the original IDs 610. In addition, during the duplication, the database 750 does not perform ID checks and other validation steps because the application is done according to the ID order as opposed to the hierarchical order, and the duplicate records 740 contain the original IDs 610. Performing validity checks during the duplication would not make sense because the IDs will change and validation would be meaningless. Consequently, the duplication step is more efficient because the additional validation steps are skipped.

After creating the duplicate records 740, the system 700 can gather all the record IDs 610 contained in the duplicate records 740 and the mapping 650. Based on the mapping 650, the system 700 can replace the record IDs contained in the duplicate records 740 with the new unique IDs 640. Finally, the system 700 can write the duplicate records 745 containing the new unique IDs 640 to the target workspace 760.

During the duplication, adding duplicate records 740 to the target workspace 760 can take time when there is a large number of duplicate records 740 to add. As records are partially added, the system 700 can hide the added records by marking the added records as trash. That way, the users viewing the target workspace 760 are not confused by the constant stream of duplicate records 740. Once the duplication is complete, and is successful, the system 700 can remove the trash duplicate records 740, thus making all the duplicate records 740 visible at the same time to a user of the target workspace 760.

Figure 8:
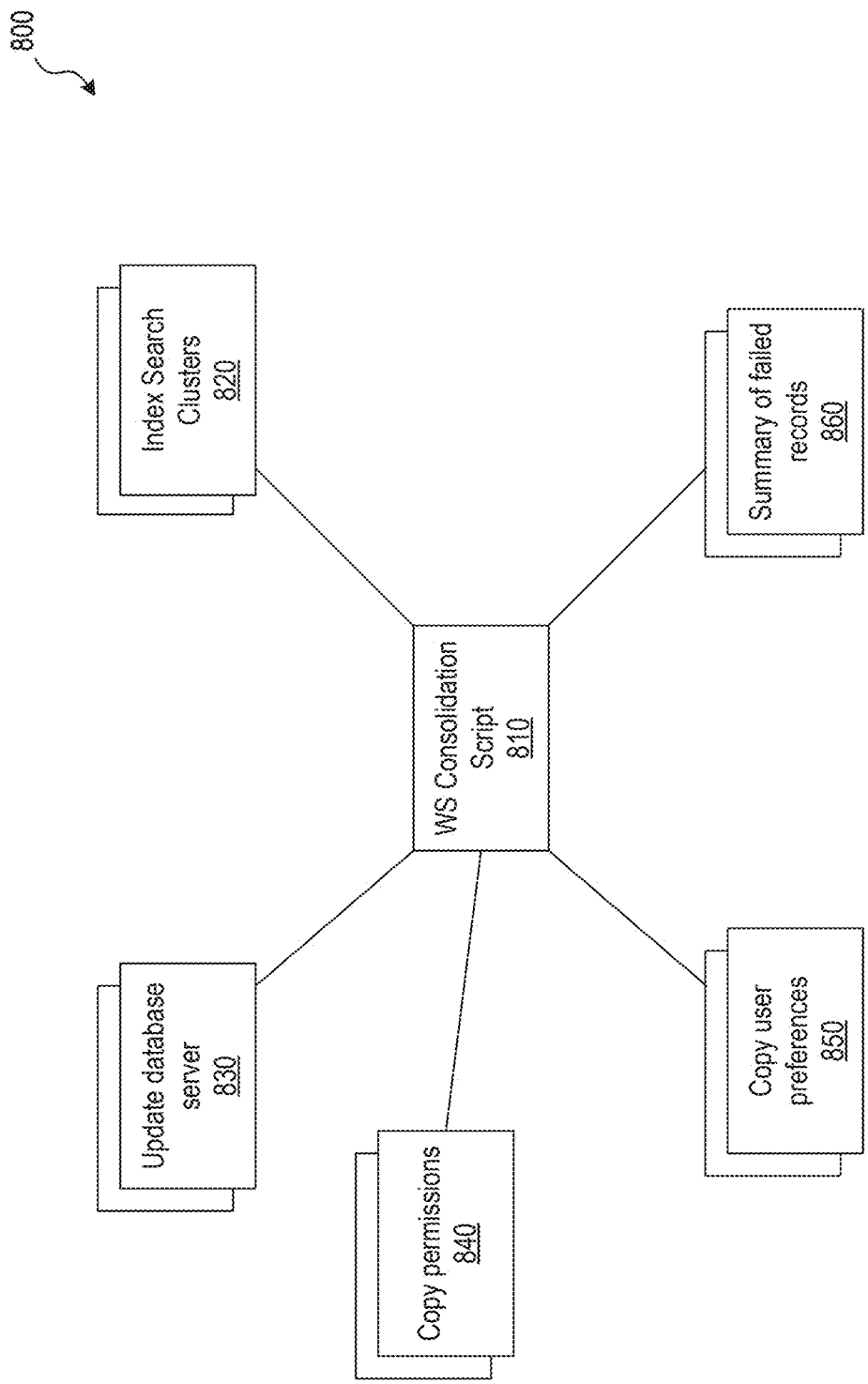
FIG. 8 shows the steps performed after completing the consolidation process.

FIG. 8 shows the steps performed after completing the consolidation process. The system 800, through the consolidation script 810, in step 820 can index the content of the copy 495 in FIG. 4 of the hierarchy of the multiple source records to enable easier searching of the duplicate records.

In step 830, the system 800 can update the database server upon completion of the duplication. The database server can cache the content of the target workspace 400 in FIG. 4, and anytime the target workspace 400 is updated, the database server updates the cache. Once the creation of the copy 495 is complete, the system 800 can update the cache at the database server.

In step 840, the system 800 can copy teamspace and workspace permissions from the source workspace 410 in FIG. 4 to the copy 495. Block level permissions can be already copied over during record duplication for blocks. In addition to copying permissions, the system 800 can copy permission groups to the copy 495, thus enabling the same groups of users to be granted the same permissions in the copy 495.

In step 850, the system 800 can make sure the user preferences from the source workspace 410 are duplicated to the copy 495. Specifically, a user of the source workspace 410 can have a preference indicating bookmarks of their favorite records in the source workspace 410. The preference can also indicate the ordering of the bookmarks of their favorite records. The system 800, in step 850, can re-create the bookmarks as well as the ordering of the bookmarks in the copy 495, so that the user can still easily access the same content through the re-created bookmarks in the target workspace 400 in FIG. 4.

The system 800 can gather the permanent errors issued during the application process. Permanent errors can indicate duplications of records that failed. In step 860, the system 800 can create a summary of the records that failed, including the IDs of the failed records, and can send the summary to a user indicating which records failed so that the user can attempt to copy those records manually. If more than a predetermined number of records has failed, such as 100 records, the system 800 can determine that the duplication has failed.

The system 800 can also check, as described earlier in this application, whether the number of records in the source workspace 410 matches the number of records in the copy 495. If that is the case and there are no permanent errors, the system can send an email to the user indicating completion of the duplication. In addition, the system can put a task in a queue to run in 30 days, where the task deletes the source workspace 410.

Users of the source workspace 410 can have favorite pages that have been bookmarked and saved in user preferences. For example, an email message may be bookmarked. The system 800 can update the bookmarks to point to the new unique IDs 640 in FIG. 6, thus preserving the bookmarks in the copy 495. In addition, the order of the bookmarks can be preserved.

The system 800 can provide a user interface to the user to initiate the consolidation process. In addition to consolidation, the system 800 can also enable the user to split the hierarchical structure 405, 415, 425 in FIG. 4 into multiple hierarchical structures. For example, the system 800 can split the hierarchical structure 405 into two hierarchical structures rooted at teamspace 430 and teamspace 440, respectively. Prior to proceeding with the splitting or merging, the system 800 can provide a preview to the user of the resulting structure. For example, before performing consolidation described in FIG. 4, the system can provide a preview of the hierarchical structure 425 to the user. Finally, after performing the splitting or the consolidation operation, the system 800 can undo the operation.

To split to the hierarchical structure into two hierarchical structures rooted at teamspace 430 and teamspace 440, respectively, the system 800 can duplicate the workspace 400, as described in this application, without setting the original workspace 400 into read-only mode. After completing the duplication, the system 800 can delete the teamspace 440 from the original workspace 400 and delete the teamspace 430 from the copied workspace 400, thus creating two hierarchical structures including teamspace 430 and teamspace 440.

Figure 9:
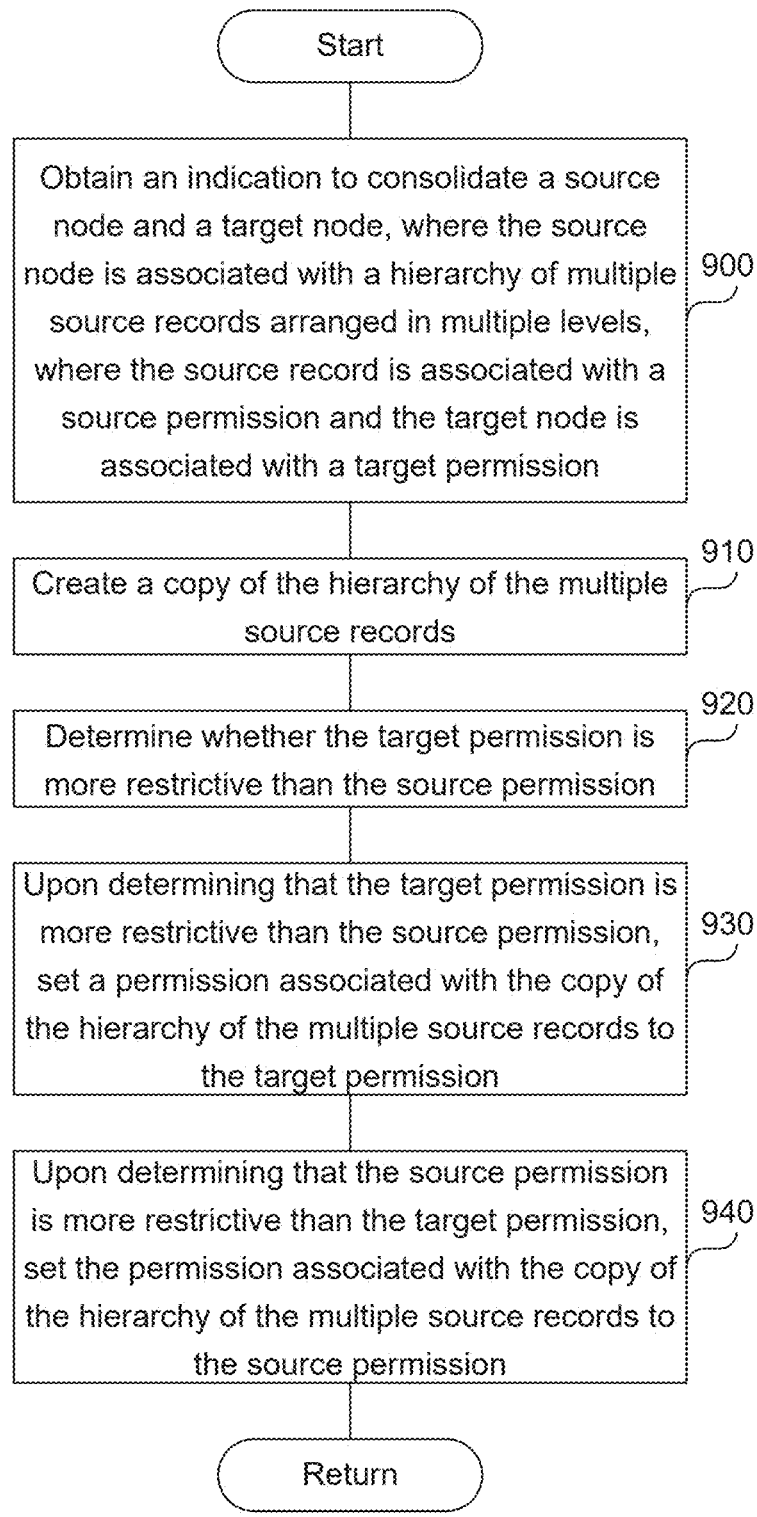
FIG. 9 is a flowchart of a method to consolidate a source workspace and a target workspace into a single workspace.

FIG. 9 is a flowchart of a method to consolidate a source workspace and a target workspace into a single workspace. In step 900, a hardware or software processor can obtain an indication to consolidate a source node and a target node. The source node and the target node can correspond to the source workspace and target workspace is described in this application, a source teamspace and a target teamspace, a source page and a target page, or a source block and a target block, respectively. The source node in the target node can be different levels of the hierarchy. For example, the source node can be a source page while the target node can be a target workspace.

The source node can be associated with a hierarchy of multiple source records arranged in multiple levels. A source record among the multiple source records can include content and can be associated with a source permission. The source permission can define a first user and a first access to the source record associated with the first user. The target node can be associated with a target permission defining a second user and a second access associated with the target node.

In step 910, the processor can create a copy of the hierarchy of the multiple source records, where the copy of the hierarchy of the multiple source records is a child of the target node.

In step 920, the processor can determine whether the target permission is more restrictive than the source permission. In step 930, upon determining that the target permission is more restrictive than the source permission, the processor can set a permission associated with the copy of the hierarchy of the multiple source records to the target permission. In step 940, upon determining that the source permission is more restrictive than the target permission, the processor can set the permission associated with the copy of the hierarchy of the multiple source records to the source permission.

Prior to creating the copy of the hierarchy of the multiple source records, the processor can set the source node to a read-only state, thereby preventing modifications to the source node. The processor can determine a number of records in the hierarchy of multiple source records. Upon creating the copy of the hierarchy of the multiple source records, the processor can determine a number of records in the copy of the hierarchy of the multiple source records. The processor can determine whether there is a difference between the number of records in the hierarchy of multiple source records and the number of records in the copy of the hierarchy of the multiple source records. Upon determining that there is the difference, the processor can notify the user of the difference.

The processor can obtain a first multiplicity of unique identifiers (IDs) associated with the hierarchy of the multiple source records, where a first unique ID in the first multiplicity of unique IDs identifies the source record among the hierarchy of the multiple source records. The processor can generate a second multiplicity of unique IDs. The processor can generate a mapping between the first multiplicity of unique IDs and the second multiplicity of unique IDs, where a second ID in the second multiplicity of unique IDs corresponds to the first unique ID in the first multiplicity of unique IDs.

Upon obtaining the mapping, the processor can create the copy of the hierarchy of the multiple source records, where the copy of the hierarchy of the multiple source records includes the first multiplicity of unique IDs. The processor can replace the first multiplicity of unique IDs with the second multiplicity of unique IDs based on the mapping between the first multiplicity of unique IDs and the second multiplicity of unique IDs, thereby removing all references to the source node. The processor can delete the source node after 30 days.

The processor can obtain a first preference associated with the first user associated with the source node, where the first preference indicates a bookmarked record included in the source node. The processor can create a copy of the bookmarked record in the copy of the hierarchy of the multiple source records. The processor can enable the first user to easily access the copy of the bookmarked record in the target node by creating a bookmark to the copy of the bookmarked record.

Upon obtaining the mapping described above, the processor can obtain a bookmark to the source record. Based on the mapping between the first multiplicity of unique IDs and the second multiplicity of unique IDs, the processor can update the bookmark to the source record to point to a copy of the source record included in the copy of the hierarchy of the multiple source records.

Until completing a creation of the copy of the hierarchy of the multiple source records within the target node, the processor can make a partial copy of the hierarchy of the multiple source records invisible to the user of the target node by marking a record in the partial copy of the hierarchy of the multiple source records as trash. Upon completing the creation of the copy of the hierarchy of the multiple source records within the target node, the processor can make the copy of the hierarchy of the multiple source records visible by removing the trash mark from the record.

Computer System

Figure 10:
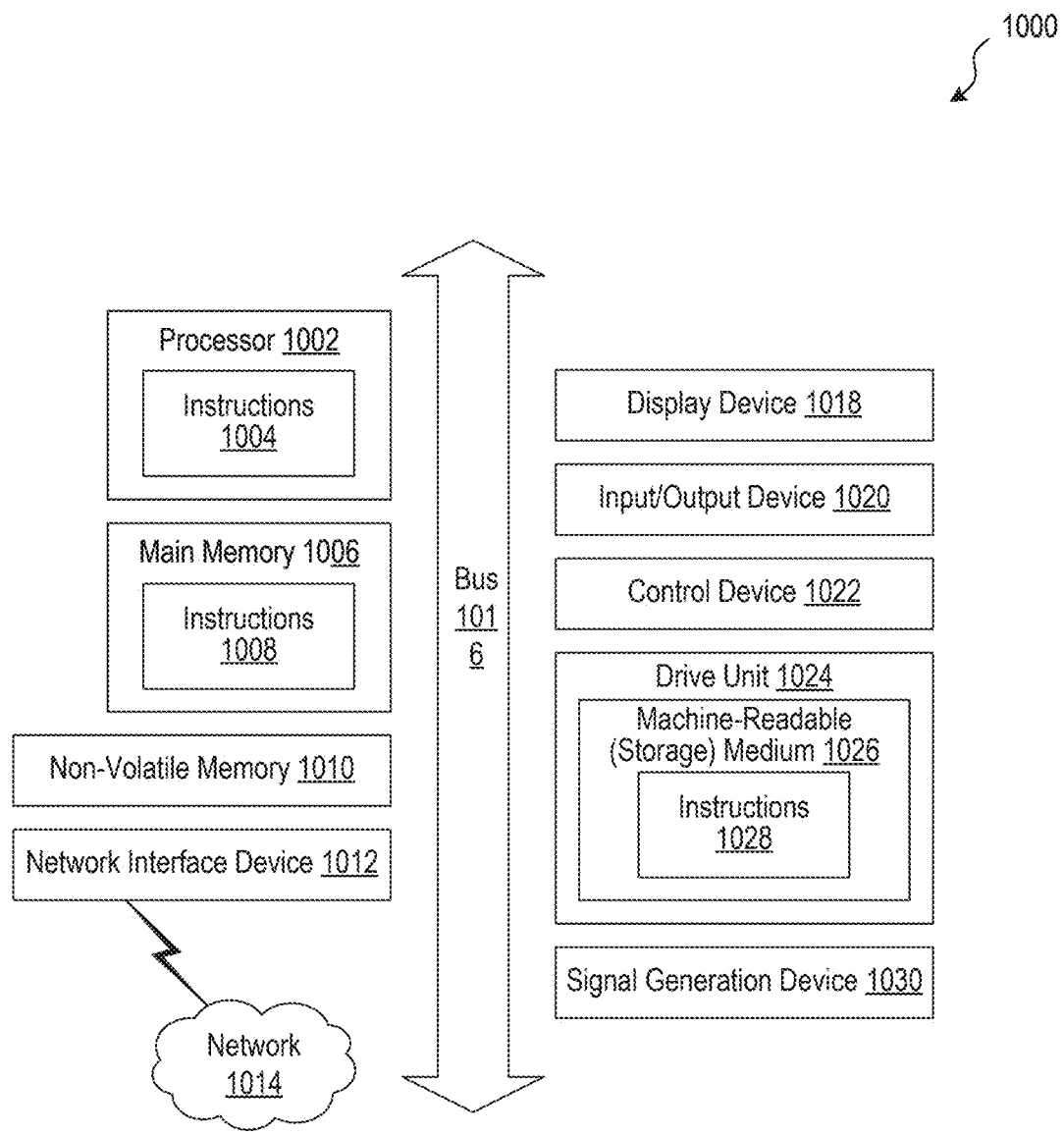
FIG. 10 is a block diagram that illustrates an example of a computer system in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, a display device 1018, an input/output device 1020, a control device 1022 (e.g., keyboard and pointing device), a drive unit 1024 that includes a machine-readable (storage) medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification can be implemented.

The computer system 1000 can take any suitable physical form. For example, the computer system 1000 can share a similar architecture as that of a server computer, personal computer (PC), tablet computer, mobile telephone, wearable electronic device, network-connected ("smart") device (e.g., a television or home assistant device), augmented reality/virtual reality (AR/VR) system (e.g., head-mounted display), or any electronic device capable of executing a set of instructions that specify action(s) to be taken by the computer system 1000. In some implementations, the computer system 1000 can be an embedded computer system, a system-on-chip (SOC), a single-board computer (SBC) system, or a distributed system such as a mesh of computer systems or include one or more cloud components in one or more networks. Where appropriate, one or more computer systems 1000 can perform operations in real time, near real time, or in batch mode.

The network interface device 1012 enables the computer system 1000 to mediate data in a network 1014 with an entity that is external to the computer system 1000 through any communication protocol supported by the computer system 1000 and the external entity. Examples of the network interface device 1012 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1006, non-volatile memory 1010, machine-readable (storage) medium 1026) can be local, remote, or distributed. Although shown as a single medium, the machine-readable (storage) medium 1026 can include multiple media (e.g., a centralized/distributed database and/or associated caches and servers) that store one or more sets of instructions 1028. The machine-readable (storage) medium 1026 can include any medium that is capable of storing, encoding, or carrying a set of instructions for execution by the computer system 1000. The machine-readable (storage) medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computer system 1000 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A non-transitory, computer-readable storage medium comprising instructions recorded thereon, wherein the instructions, when executed by at least one data processor of a system, cause the system to:
   obtain an indication to consolidate a source workspace and a target workspace,
      wherein the source workspace is associated with a hierarchy of multiple source records arranged in multiple levels,
      wherein a source record among the multiple source records includes content,
      wherein the source record is associated with a source permission defining a first user and a first access to the source record associated with the first user, and
      wherein the target workspace is associated with a target permission defining a second user and a second access associated with the target workspace;
   prevent modifications to the source workspace;
   create a copy of the hierarchy of the multiple source records including the content,
      wherein the copy of the hierarchy of the multiple source records is a child of the target workspace;
   determine whether the target permission is more restrictive than the source permission;
   upon determining that the target permission is more restrictive than the source permission, set a permission associated with the copy of the hierarchy of the multiple source records to the target permission;
   upon determining that the source permission is more restrictive than the target permission, set the permission associated with the copy of the hierarchy of the multiple source records to the source permission; and
   upon expiration of a predetermined amount of time, delete the source workspace.

2. The non-transitory, computer-readable storage medium of claim 1, comprising instructions to:
   obtain a first multiplicity of unique identifiers (IDs) associated with the hierarchy of the multiple source records,
      wherein a first unique ID in the first multiplicity of unique IDs identifies the source record among the hierarchy of the multiple source records;
   generate a second multiplicity of unique IDs;
   generate a mapping between the first multiplicity of unique IDs and the second multiplicity of unique IDs,
      wherein a second ID in the second multiplicity of unique IDs corresponds to the first unique ID in the first multiplicity of unique IDs;
   create the copy of the hierarchy of the multiple source records,
      wherein the copy of the hierarchy of the multiple source records includes the first multiplicity of unique IDs; and
   replace the first multiplicity of unique IDs with the second multiplicity of unique IDs based on the mapping between the first multiplicity of unique IDs and the second multiplicity of unique IDs, thereby removing all references to the source workspace.

3. The non-transitory, computer-readable storage medium of claim 1, comprising instructions to:
   determine a number of records in the hierarchy of multiple source records;
   upon creating the copy of the hierarchy of the multiple source records, determine a number of records in the copy of the hierarchy of the multiple source records;
   determine whether there is a difference between the number of records in the hierarchy of multiple source records and the number of records in the copy of the hierarchy of the multiple source records; and
   upon determining that there is the difference, generate an indication of the difference.

4. The non-transitory, computer-readable storage medium of claim 1, comprising instructions to:
   obtain a first multiplicity of unique identifiers (IDs) associated with the hierarchy of the multiple source records,
      wherein a first unique ID in the first multiplicity of unique IDs identifies the source record among the hierarchy of the multiple source records;
   generate a second multiplicity of unique IDs; and
   generate a mapping between the first multiplicity of unique IDs and the second multiplicity of unique IDs,
      wherein a second ID in the second multiplicity of unique IDs corresponds to the first unique ID in the first multiplicity of unique IDs.

5. The non-transitory, computer-readable storage medium of claim 1, comprising instructions to:
   obtain a first preference associated with the first user associated with the source workspace,
      wherein the first preference indicates a bookmarked record included in the source workspace;
   create a copy of the bookmarked record in the copy of the hierarchy of the multiple source records; and enable the first user to easily access the copy of the bookmarked record in the target workspace by creating a bookmark to the copy of the bookmarked record.

6. The non-transitory, computer-readable storage medium of claim 1, comprising instructions to:
obtain a first multiplicity of unique identifiers (IDs) associated with the hierarchy of the multiple source records,
wherein a first unique ID in the first multiplicity of unique IDs identifies the source record among the hierarchy of the multiple source records;
generate a second multiplicity of unique IDs; and
generate a mapping between the first multiplicity of unique IDs and the second multiplicity of unique IDs,
wherein a second ID in the second multiplicity of unique IDs corresponds to the first unique ID in the first multiplicity of unique IDs;
obtain a bookmark to the source record; and
based on the mapping between the first multiplicity of unique IDs and the second multiplicity of unique IDs, update the bookmark to the source record to point to a copy of the source record included in the copy of the hierarchy of the multiple source records.

7. The non-transitory, computer-readable storage medium of claim 1, comprising instructions to:
until completing a creation of the copy of the hierarchy of the multiple source records within the target workspace, make a partial copy of the hierarchy of the multiple source records invisible to a user of the target workspace by marking a record in the partial copy of the hierarchy of the multiple source records as trash; and
upon completing the creation of the copy of the hierarchy of the multiple source records within the target workspace, make the copy of the hierarchy of the multiple source records visible by removing the trash mark from the record.

8. A method comprising:
obtaining an indication to consolidate a source node and a target node,
wherein the source node is associated with a hierarchy of multiple source records arranged in multiple levels,
wherein a source record among the multiple source records is associated with a source permission, and
wherein the target node is associated with a target permission;
creating a copy of the hierarchy of the multiple source records,
wherein the copy of the hierarchy of the multiple source records is a child of the target node;
determining whether the target permission is more restrictive than the source permission;
upon determining that the target permission is more restrictive than the source permission, setting a permission associated with the copy of the hierarchy of the multiple source records to the target permission; and
upon determining that the source permission is more restrictive than the target permission, setting the permission associated with the copy of the hierarchy of the multiple source records to the source permission.

9. The method of claim 8, comprising:
prior to creating the copy of the hierarchy of the multiple source records, preventing modifications to the source node;
determining a number of records in the hierarchy of multiple source records;
upon creating the copy of the hierarchy of the multiple source records, determining a number of records in the copy of the hierarchy of the multiple source records;
determining whether there is a difference between the number of records in the hierarchy of multiple source records and the number of records in the copy of the hierarchy of the multiple source records; and
upon determining that there is the difference, generate an indication of the difference.

10. The method of claim 8, comprising:
obtaining a first multiplicity of unique identifiers (IDs) associated with the hierarchy of the multiple source records,
wherein a first unique ID in the first multiplicity of unique IDs identifies the source record among the hierarchy of the multiple source records;
generating a second multiplicity of unique IDs;
generating a mapping between the first multiplicity of unique IDs and the second multiplicity of unique IDs,
wherein a second ID in the second multiplicity of unique IDs corresponds to the first unique ID in the first multiplicity of unique IDs;
creating the copy of the hierarchy of the multiple source records,
wherein the copy of the hierarchy of the multiple source records includes the first multiplicity of unique IDs; and
replacing the first multiplicity of unique IDs with the second multiplicity of unique IDs based on the mapping between the first multiplicity of unique IDs and the second multiplicity of unique IDs, thereby removing all references to the source node.

11. The method of claim 8, comprising:
obtaining a first preference associated with a first user associated with the source node,
wherein the first preference indicates a bookmarked record included in the source node;
creating a copy of the bookmarked record in the copy of the hierarchy of the multiple source records; and
enabling the first user to easily access the copy of the bookmarked record in the target node by creating a bookmark to the copy of the bookmarked record.

12. The method of claim 8, comprising:
obtaining a first multiplicity of unique identifiers (IDs) associated with the hierarchy of the multiple source records,
wherein a first unique ID in the first multiplicity of unique IDs identifies the source record among the hierarchy of the multiple source records;
generating a second multiplicity of unique IDs;
generating a mapping between the first multiplicity of unique IDs and the second multiplicity of unique IDs,
wherein a second ID in the second multiplicity of unique IDs corresponds to the first unique ID in the first multiplicity of unique IDs;
obtaining a bookmark to the source record; and
based on the mapping between the first multiplicity of unique IDs and the second multiplicity of unique IDs, updating the bookmark to the source record to point to a copy of the source record included in the copy of the hierarchy of the multiple source records.

13. The method of claim 8, comprising:
until completing a creation of the copy of the hierarchy of the multiple source records within the target node, making a partial copy of the hierarchy of the multiple source records invisible to a user of the target node by marking a record in the partial copy of the hierarchy of the multiple source records as trash; and upon completing the creation of the copy of the hierarchy of the multiple source records within the target node, making the copy of the hierarchy of the multiple source records visible by removing the trash mark from the record.

14. A system comprising:

at least one hardware processor; and at least one non-transitory memory storing instructions, which, when executed by the at least one hardware processor, cause the system to:

obtain an indication to consolidate a source node and a target node, wherein the source node is associated with a hierarchy of multiple source records arranged in multiple levels, wherein a source record among the multiple source records is associated with a source permission, and wherein the target node is associated with a target permission;

create a copy of the hierarchy of the multiple source records, wherein the copy of the hierarchy of the multiple source records is a child of the target node;

determine whether the target permission is more restrictive than the source permission;

upon determining that the target permission is more restrictive than the source permission, set a permission associated with the copy of the hierarchy of the multiple source records to the target permission; and upon determining that the source permission is more restrictive than the target permission, set the permission associated with the copy of the hierarchy of the multiple source records to the source permission.

15. The system of claim 14, comprising instructions to:

prior to creating the copy of the hierarchy of the multiple source records, preventing modifications to the source node;

determine a number of records in the hierarchy of multiple source records;

upon creating the copy of the hierarchy of the multiple source records, determine a number of records in the copy of the hierarchy of the multiple source records;

determine whether there is a difference between the number of records in the hierarchy of multiple source records and the number of records in the copy of the hierarchy of the multiple source records; and upon determining that there is the difference, generate an indication of the difference.

16. The system of claim 14, comprising instructions to:

obtain a first multiplicity of unique identifiers (IDs) associated with the hierarchy of the multiple source records, wherein a first unique ID in the first multiplicity of unique IDs identifies the source record among the hierarchy of the multiple source records;

generate a second multiplicity of unique IDs; and generate a mapping between the first multiplicity of unique IDs and the second multiplicity of unique IDs, wherein a second ID in the second multiplicity of unique IDs corresponds to the first unique ID in the first multiplicity of unique IDs.

17. The system of claim 14, comprising instructions to:

obtain a first multiplicity of unique identifiers (IDs) associated with the hierarchy of the multiple source records, wherein a first unique ID in the first multiplicity of unique IDs identifies the source record among the hierarchy of the multiple source records;

generate a second multiplicity of unique IDs;

generate a mapping between the first multiplicity of unique IDs and the second multiplicity of unique IDs, wherein a second ID in the second multiplicity of unique IDs corresponds to the first unique ID in the first multiplicity of unique IDs;

create the copy of the hierarchy of the multiple source records, wherein the copy of the hierarchy of the multiple source records includes the first multiplicity of unique IDs; and replace the first multiplicity of unique IDs with the second multiplicity of unique IDs based on the mapping between the first multiplicity of unique IDs and the second multiplicity of unique IDs, thereby removing all references to the source node.

18. The system of claim 14, comprising instructions to:

obtain a first preference associated with a first user associated with the source node, wherein the first preference indicates a bookmarked record included in the source node;

create a copy of the bookmarked record in the copy of the hierarchy of the multiple source records; and enable the first user to easily access the copy of the bookmarked record in the target node by creating a bookmark to the copy of the bookmarked record.

19. The system of claim 14, comprising instructions to:

obtain a first multiplicity of unique identifiers (IDs) associated with the hierarchy of the multiple source records, wherein a first unique ID in the first multiplicity of unique IDs identifies the source record among the hierarchy of the multiple source records;

generate a second multiplicity of unique IDs;

generate a mapping between the first multiplicity of unique IDs and the second multiplicity of unique IDs, wherein a second ID in the second multiplicity of unique IDs corresponds to the first unique ID in the first multiplicity of unique IDs;

obtain a bookmark to the source record; and based on the mapping between the first multiplicity of unique IDs and the second multiplicity of unique IDs, update the bookmark to the source record to point to a copy of the source record included in the copy of the hierarchy of the multiple source records.

20. The system of claim 14, comprising instructions to:

until completing a creation of the copy of the hierarchy of the multiple source records within the target node, make a partial copy of the hierarchy of the multiple source records invisible to a user of the target node by marking a record in the partial copy of the hierarchy of the multiple source records as trash; and upon completing the creation of the copy of the hierarchy of the multiple source records within the target node, make the copy of the hierarchy of the multiple source records visible by removing the trash mark from the record.

* * * * *